United States Patent [19]

Hoepfl et al.

[11] 4,024,937
[45] May 24, 1977

[54] MECHANICAL TRANSMISSION BRAKE

[75] Inventors: Joseph R. Hoepfl, Greenfield; Gerardus M. Ballendux, Waukesha, both of Wis.

[73] Assignee: Allis-Chalmers Corporation, Milwaukee, Wis.

[22] Filed: Dec. 8, 1975

[21] Appl. No.: 638,764

[52] U.S. Cl. .............................. 192/13 R; 192/4 A; 188/72.7
[51] Int. Cl.² .......................................... F16D 67/02
[58] Field of Search ........... 192/109 A, 18 A, 13 R, 192/4 A

[56] References Cited
UNITED STATES PATENTS

| | | | |
|---|---|---|---|
| 1,739,946 | 12/1929 | Carhart | 192/13 R |
| 1,880,066 | 9/1932 | Barnes | 192/13 R X |
| 3,645,367 | 2/1972 | Coleman et al. | 192/13 R X |
| 3,771,630 | 11/1973 | Koivunen | 192/4 A X |

*Primary Examiner*—Benjamin W. Wyche
*Attorney, Agent, or Firm*—Arthur L. Nelson

[57] ABSTRACT

A clutch pedal operated mechanical transmission brake for stopping the rotating elements in a transmission during shifting to reduce shifting time. The force applying the brake is limited since it is transmitted through resilient means to avoid overheating of the brake and prevent the brake from being used to stop the vehicle.

10 Claims, 4 Drawing Figures

Fig. 1

MECHANICAL TRANSMISSION BRAKE

This invention relates to vehicle brakes and more particularly to a clutch pedal operated transmission brake to overcome the rotational inertia of rotating elements in the transmission to reduce the shifting time for shifting a range transmission.

It is an object of this invention to provide a clutch pedal operated transmission brake to brake rotating elements in the vehicle transmission for easier shifting of a manual sleeve clutch.

It is a further object of this invention to provide a clutch operated transmission brake through a resilient actuating means to avoid overheating of the brakes and to reduce the shifting time of a sleeve clutch.

It is a further object of this invention to provide a clutch operated transmission brake with a cam operated brake shoe operated in response to actuating the vehicle clutch to overcome rotational inertia of rotating components in the transmission to reduce shifting time for shifting of a positive type mechanical sleeve clutch.

The objects of this invention are accomplished by providing an engine clutch for transmitting power from the engine to an auxiliary power shift transmission. The auxiliary power shift transmission drives into a multiple speed main transmission which is manually shifted to provide selective gear ratios of the overall power train. Each of the speed ratios of the main transmission are multiplied by the number of speed ratios of the power shift transmission which is immediately in front of the main transmission. The main transmission is a manually operated positive clutch transmmission in which the gear ratios are selected by selectively moving a clutch sleeve selectively engaging one speed or another. In order to selectively shift the main transmission which has manual shift, the gears must be synchronized before the clutch sleeve can be shifted to the selected gear range. Accordingly, an engine clutch is provided to interrupt power from the engine to the power shift transmission. By interrupting the power between the engine and the power shift transmission and disengaging the power shift clutches in the power shift transmission the main transmission can be shifted. To overcome the rotational inertia of the rotating elements in the power shift transmission which is connected through the output shaft of the power shift transmission and the input of the main transmission, a mechanical brake is connected to the clutch pedal which operates the engine clutch. The link connected to the clutch pedal is connected to a cam operated mechanical brake for reducing the rotational speed of the output shaft in the power shift transmission. To avoid using the mechanical transmission brake as a brake for braking the vehicle, a resilient link is connected between the clutch lever and the cam for operating the mechanical brake. Accordingly, when the engine clutch is disengaged, a mechanical transmission brake is automatically engaged and the rotational inertia of the rotating elements of the transmission are overcome so that the mechanical shifting main transmission can be readily shifted to the selected gear ratio as desired by the operator.

The transmission brake consists essentially of a resilient linkage connected between the clutch pedal for operating the engine clutch and an arm operating a cam in the transmission. The cam in the transmission operates a follower which in turn engages a brake shoe engaging a radial surface on a rotating clutch carrier in the transmmission. The actuation of the transmission brake is automatic whenever the engine clutch is disengaged and the rotational inertia of the rotating components in the vehicle transmission are overcome as the engine clutch is disengaged to reduce the shifting time required in the main transmission.

Referring to the drawings, the preferred embodiment of this invention is illustrated:

Figure 1:
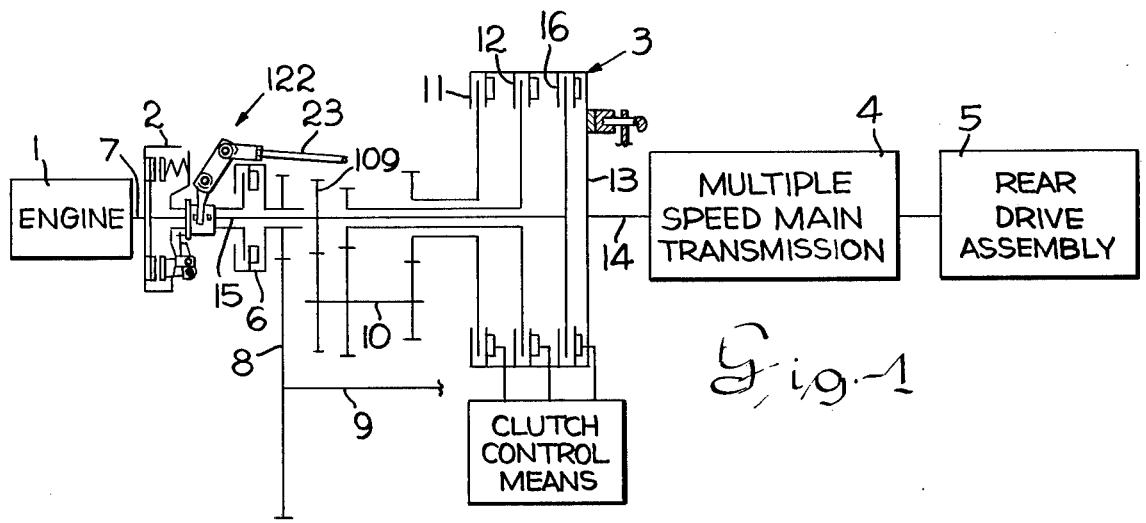
FIG. 1 illustrates a schematic drawing showing the engine and clutch intermediate the engine and the power shift transmission and a multiple speed main transmission and rear drive assembly comprising the overall power train.

Referring to the drawings, the preferred embodiment of this invention is illustrated. FIG. 1 shows the overall power train including the engine, the engine clutch, the power shift transmission, the multiple speed main transmission, which includes mechanical clutch sleeves having spline teeth to selectively engage spline teeth gears for shifting the transmission, and the rear drive assembly.

Referring to FIG. 1, a schematic illustration of the power train is shown. The engine 1 drives through the engine clutch 2 which in turn drives through the auxiliary power shift transmission 3 and the multiple speed main transmission 4 through the rear drive assembly 5. A power takeoff clutch 6 also receives power from the drive shaft 7 which drives through the power takeoff gearset 8 to the power takeoff shaft 9. The auxiliary power shift transmission 3 is provided with a countershaft gearset 109 which drives through the countershaft 10. The power from the drive shaft 7 to the power shift transmission 3 can selectively drive through the countershaft gearset 109 and countershaft 10 and through the clutches 11 or 12 to the clutch carrier 13 to the output shaft 14. A direct drive is also provided through the input shaft 15 to the output shaft 14 when the clutch 16 is actuated.

Figure 3:
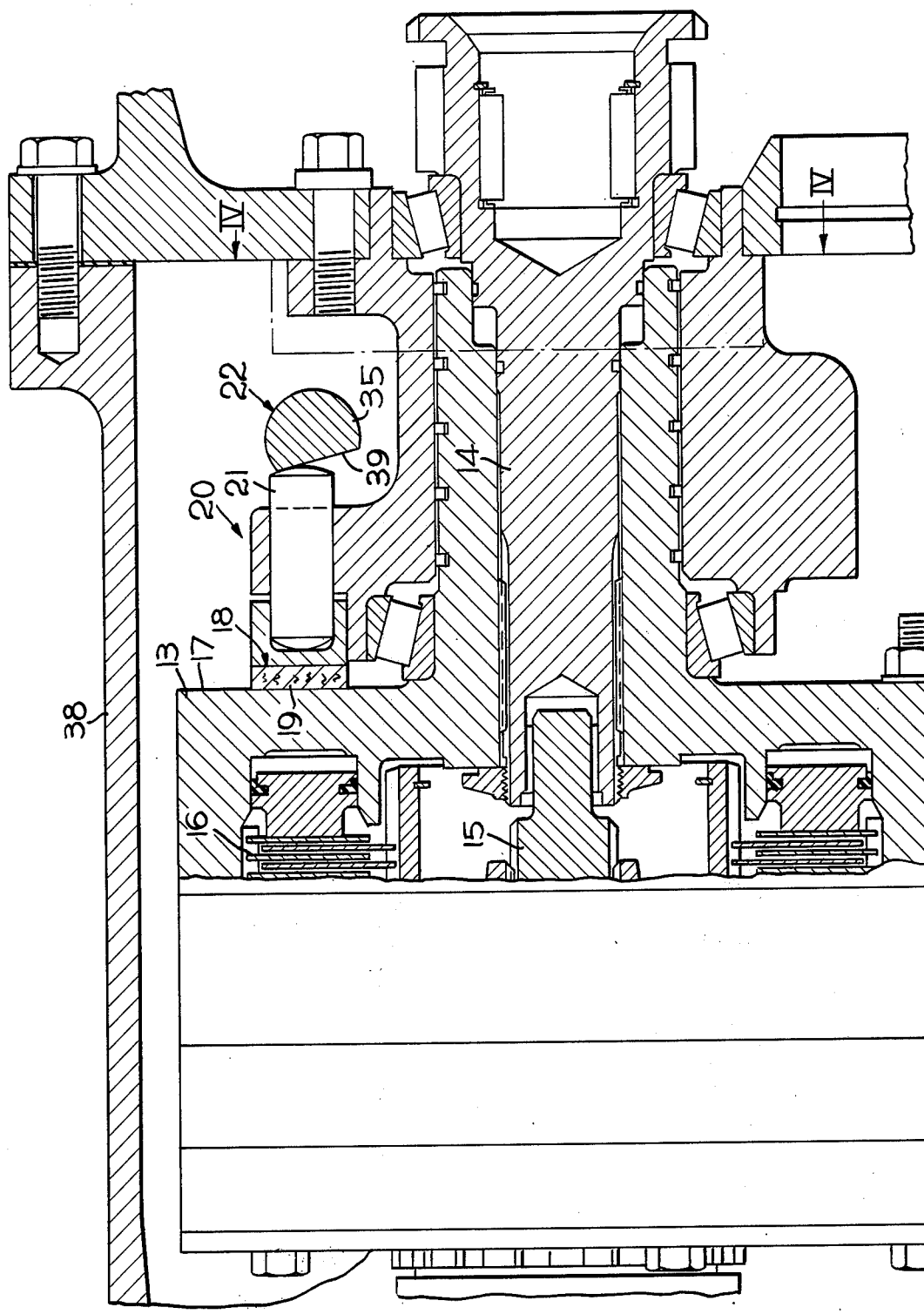
FIG. 3 illustrates a cross-section view of the mechanical brake in the transmission and the cam operating means for operating the brake.

The auxiliary power shift transmission 3 is shown in FIG. 3. The input shaft 15 and clutch carrier 13 transmits power to the output shaft 14 by selective engagement with one of the clutches 11, 12 and 16. The clutch carrier 13 is formed with radial braking surface 17. The brake shoe 18 is formed with friction material 19 which selectively engages the radial braking surface 17 when the transmission brake is actuated. The brake 20 is actuated by the follower 21 engaging the cam 22 when the clutch is actuated. The brake 20 is not intended to be a service brake for braking the vehicle, but is merely for braking the rotational inertia of the transmission at the output shaft 14. The multiple speed main transmission 4 is a mechanical transmission with clutch sleeves which can be selectively shifted manually. The clutch sleeves may operate with a synchronizer or a conventional clutch sleeve which shifts from one gear to another by means of a shift rail to selectively engage the desired speed ratio as the clutch sleeve is shifted. A plurality of clutch sleeves and gears with a plurality of shift rails in the tranmission provides for a plurality of speed ratios including a reverse in the multiple speed main transmission. The braking of the shaft 14 brakes the rotation of the rotating elements in the transmission so the sleeve can be shifted from one gear ratio to another. The positive type clutch is generally shifted when the vehicle is standing still and the engine clutch 2 is disengaged.

Referring to FIG. 1, the engine clutch 2 is shown. A linkage 122 engages and disengages the engine clutch 2. The linkage 122 is connected through the rod 23 which is pivotally connected to the arm 24 of the clutch pedal 25, refer to FIG. 2. The clutch pedal 25 is pivotally mounted on the shaft 26 which is supported in the vehicle chassis. The return spring 27 is pivotally connected to the bracket 28 mounted on the vehicle chassis to return the clutch pedal 25 to its normally retracted position. The return spring 27 is connected to the arm 28 on the clutch pedal 25.

Figure 2:
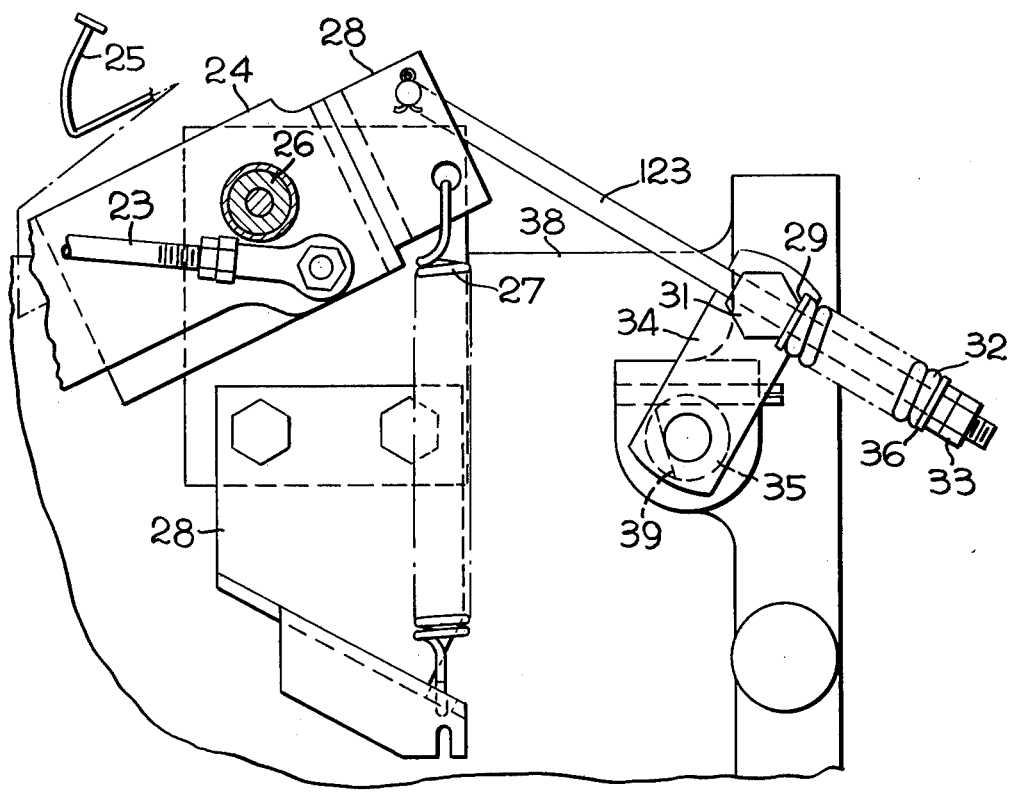
FIG. 2 illustrates a clutch pedal and linkage between the transmission and the clutch pedal together with the linkage for operating the mechanical transmission brake in the clutch disengaged position.
Figure 4:
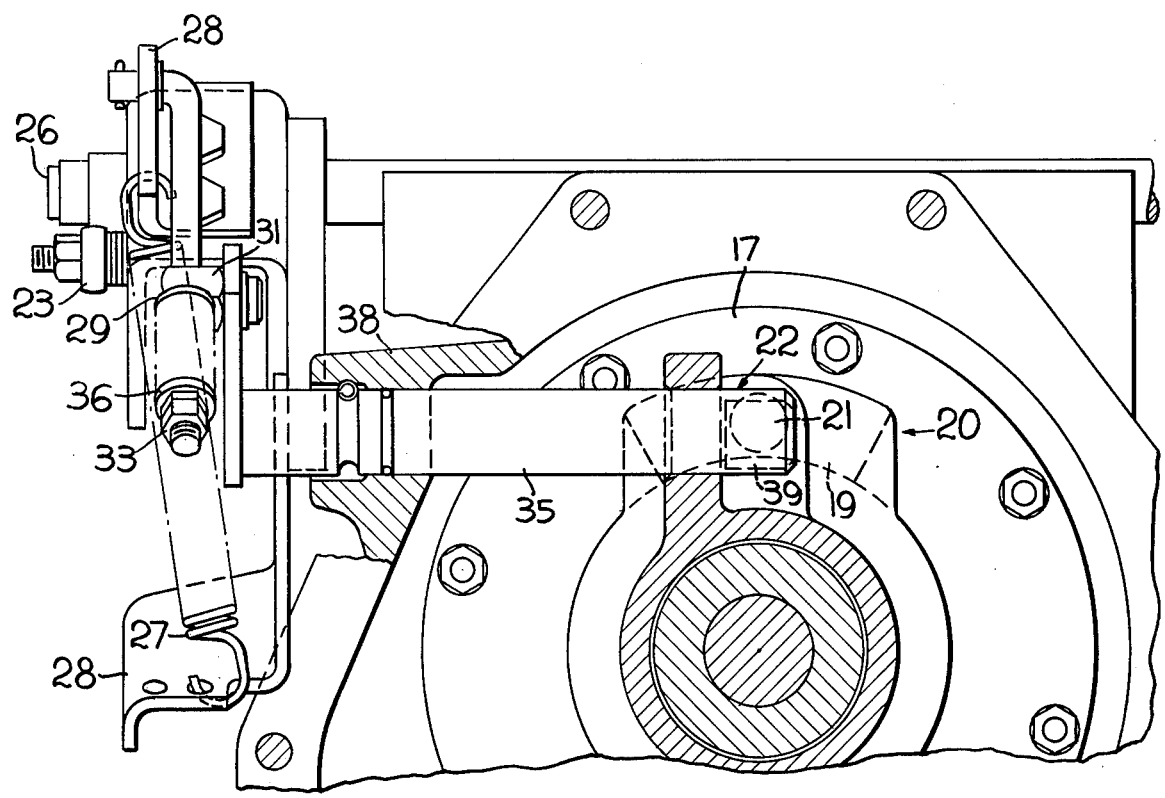
FIG. 4 is a cross-section view taken on line IV—IV of FIG. 3 with a portion of the housing broken away and showing the linkage at FIG. 2.

The arm 28 is pivotally connected to the rod 123 which in turn is connected to the guide pin 31. The rod extends through the guide pin 31 and the spring 32 is compressively positioned on the guide pin 31. FIGS. 2 and 4 show the linkage in an enlarged view with the shaft 35 extending into the transmission housing. The nut assembly 33 is fixed to the rod 123. The guide pin 31 engages a washer 29 and the spring 32 is compressively positioned between washers 20 and 36. The compressive force of the spring 32 operates the lever 34 as the rod 123 slides through an opening in the guide pin 31.

The shaft 35 is mounted witin the transmission housing 38 and extends inwardly to form the cam surface 39 of the cam 22. Rotatonal movement of the shaft 35 causes the cam surface 39 to press against the cam follower 21 and engage the friction material 19 of the shoe 18 on the brake surface 17.

The brake for the transmission operates in the following manner.

As the clutch pedal 25 is depressed, the pedal rotates in the counterclockwise direction as viewed in FIG. 2. The rod 23 moves in the right-hand direction to disengage the clutch 2. Simultaneously, the rod 123 moves in the left-hand direction which compresses spring 32. Compression of the spring 32 produces a force on the guide pin 31 and rotates the arm 34 in a counterclockwise direction. A counterclockwise direction of rotation of the arm 34 will cause the shaft 35 to rotate on its axis. This in turn will cause the cam surface 39 to press against the follower 21 moving the brake shoe 18 as viewed in FIGS. 2 and 3 in a left-hand direction. As the brake shoe 18 moves in the left-hand direction, the friction material 19 engages the braking surface 17. This in turn brakes the clutch carrier 3 and retards the rotational movement of the drive shaft 14. As the clutch 2 is disengaged, the drive shaft 14 is braked and the multiple speed transmission can be shifted to the selected gear ratio of the transmission. Accordingly, as the engine clutch 2 is disengaged, the rotating components in the auxiliary countershaft transmission 3 are automatically braked. This reduces the shifting time for the main transmission 4 which is a mechanical positive clutch type transmission.

The embodiments of the invention in which an exclusive property or privelege is claimed are defined as follows :

1. A clutch pedal operated transmission brake comprising, a power transmission clutch adapted for transmitting power to a transmission, a clutch pedal for operating the power transmission clutch, a drive shaft in said transmission, a rotating member connected to said drive shaft defining a braking surface, a brake shoe for engaging said braking surface, a cam mounted in said transmission, a follower means engaging said cam and actuating said brake shoe for engaging said braking surface, a lever on said cam, an arm on said clutch pedal, a resilient link means connected to said arm on said clutch pedal and said lever on said cam for operating said cam to thereby operate said brake when said clutch pedal is operated for disengaging said power transmission clutch.

2. A clutch pedal operated transmission brake as set forth in claim 1 wherein said resilient link means includes a link pivotally connected to said clutch pedal, a spring mounted on said link compressively positoned between said lever and an abutment on said link to compressively provide an actuating force for operating said transmission brake.

3. A clutch pedal operated transmission brake as set forth in claim 1 wherein said lever and said cam includes a shaft connected to a lever, a cam surface formed on said shaft for engaging said follower to actuate said brakes.

4. A clutch pedal operated transmission brake as set forth in claim 1 wherein said follower means includes a pushrod slidably positioned between said cam and said brake shoe.

5. A clutch pedal operated transmission brake as set forth in claim 1 wherein said follower means includes a pushrod reciprocably mounted in said transmission engaging said brake shoe and said cam, means mounting said brake shoe on the end of said pushrod reciprocably for engaging said brake shoe with said rotating member.

6. A clutch pedal operated transmission brake as set forth in claim 1 including a transmission housing rotatably supporting said rotating member and pivotally supporting said cam.

7. A clutch pedal operated transmission brake as set forth in claim 1 wherein said resilient link means includes a spring for transmitting a force for operating said braking means.

8. A clutch pedal operated transmission brake as set forth in claim 1 including means pivotally supporting said pedal, means pivotally supporting a cam shaft for transmitting a brake actuating force to said cam for engaging transmission brake.

9. A clutch pedal operated transmission brake as set forth in claim 1 wherein said rotating member includes a clutch carrier, bearing means rotatably supporting said clutch carrier, means pivotally supporting a shaft defining said cam producing an axial force on said clutch carrier when said brake is actuated.

10. A clutch pedal operated transmission brake as set forth in claim 1 wherein said rotating member defines a radial braking surface, means reciprocably supporting said cam follower means, means rotatably supporting said cam for biasing said cam follower means for engaging said brake shoe with said rotating member when said brake is actuated.

* * * * *